United States Patent
Seo et al.

(10) Patent No.: US 9,075,627 B2
(45) Date of Patent: Jul. 7, 2015

(54) SERVER CONNECTED TO IMAGE FORMING APPARATUS AND CLIENT, CLIENT, AND METHOD OF REMOTELY INSTALLING DRIVER OF IMAGE FORMING APPARATUS

(75) Inventors: Jung-soo Seo, Suwon-si (KR);
Sang-min Lee, Suwon-si (KR);
Tae-kyung Hwang, Seoul (KR);
Deok-hee Boo, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 240 days.

(21) Appl. No.: 12/835,895

(22) Filed: Jul. 14, 2010

(65) Prior Publication Data

US 2011/0137979 A1    Jun. 9, 2011

(30) Foreign Application Priority Data

Dec. 4, 2009 (KR) .......................... 10-2009-0119820

(51) Int. Cl.
*G06F 15/16* (2006.01)
*G06F 9/44* (2006.01)

(52) U.S. Cl.
CPC .................................... *G06F 9/4411* (2013.01)

(58) Field of Classification Search
CPC . G06F 19/3418; G06F 9/4411; G06F 3/1204;
G06F 3/1263; G06F 9/50; G06F 9/5011
USPC ............ 709/203, 217, 219–222; 717/11, 176,
717/171
See application file for complete search history.

(56) References Cited

U.S. PATENT DOCUMENTS

| 6,237,144 | B1 * | 5/2001 | Delo ............................. 717/174 |
| 6,607,314 | B1 * | 8/2003 | McCannon et al. ............ 400/62 |
| 6,681,392 | B1 * | 1/2004 | Henry et al. ................... 717/176 |
| 6,970,698 | B2 * | 11/2005 | Majmundar et al. .......... 455/419 |
| 7,552,432 | B2 * | 6/2009 | Aiba ............................. 717/177 |
| 7,792,931 | B2 * | 9/2010 | Vinberg et al. ............... 709/220 |
| 8,051,414 | B2 * | 11/2011 | Stender et al. ................ 717/168 |
| 8,504,067 | B2 * | 8/2013 | Majmundar et al. ........ 455/456.1 |
| 8,505,005 | B1 * | 8/2013 | Bos et al. ....................... 717/177 |

(Continued)

FOREIGN PATENT DOCUMENTS

EP       1 168 163 A1       1/2002

OTHER PUBLICATIONS

EP Search Report issued May 27, 2011 in EP Patent Application No. 10167875.3.

*Primary Examiner* — Wing F Chan
*Assistant Examiner* — Benjamin M Thieu
(74) *Attorney, Agent, or Firm* — Staas & Halsey LLP

(57) ABSTRACT

A server connected to an image forming apparatus and a client, a client, and a method of remotely installing a driver of the image forming apparatus. A method of remotely installing a driver of an image forming apparatus in which a server is connected to at least one image forming apparatus and at least one client, the method including selecting at least one client where a driver of the image forming apparatus is to be installed, selecting a kind of at least one driver to be installed in the selected at least one client, receiving status information from the selected at least one client, displaying installation information of the driver on the at least one selected client according to the received status information, and selectively installing the driver in the selected at least one client according to the display installation information.

18 Claims, 15 Drawing Sheets

(56) References Cited

U.S. PATENT DOCUMENTS

| | | | |
|---|---|---|---|
| 2003/0131149 A1* | 7/2003 | Sugiura | 709/321 |
| 2004/0111578 A1* | 6/2004 | Goodman et al. | 711/163 |
| 2004/0153530 A1* | 8/2004 | Machida | 709/220 |
| 2004/0176070 A1* | 9/2004 | Lai et al. | 455/411 |
| 2004/0199572 A1* | 10/2004 | Hunt et al. | 709/201 |
| 2006/0031529 A1* | 2/2006 | Keith | 709/227 |
| 2006/0037029 A1* | 2/2006 | Yamada | 719/327 |
| 2006/0258342 A1* | 11/2006 | Fok et al. | 455/414.1 |
| 2007/0006219 A1* | 1/2007 | Sinha et al. | 717/174 |
| 2007/0192453 A1* | 8/2007 | Copeland et al. | 709/223 |
| 2007/0261047 A1* | 11/2007 | Sah et al. | 717/168 |
| 2008/0114860 A1* | 5/2008 | Keys et al. | 709/219 |
| 2008/0140821 A1* | 6/2008 | Tada | 709/223 |
| 2009/0083733 A1* | 3/2009 | Chen et al. | 717/178 |
| 2009/0288079 A1* | 11/2009 | Zuber et al. | 717/176 |

* cited by examiner

SERVER CONNECTED TO IMAGE FORMING APPARATUS AND CLIENT, CLIENT, AND METHOD OF REMOTELY INSTALLING DRIVER OF IMAGE FORMING APPARATUS

CROSS-REFERENCE TO RELATED APPLICATIONS

This application claims priority under 35 U.S.C. §119(a) from Korean Patent Application No. 10-2009-0119820, filed on Dec. 4, 2009 in the Korean Intellectual Property Office, the disclosure of which is incorporated herein by reference in its entirety.

BACKGROUND

1. Field of the Invention

Apparatuses and methods of the exemplary embodiments of the present general inventive concept relate to a server connected to an image forming apparatus and a client, a client, and a method of remotely installing a driver of the image forming apparatus, and more particularly, to a server connected to an image forming apparatus and a client to remotely install a driver by client groups according to status information of a client, a client, and a method of remotely installing a driver of the image forming apparatus.

2. Description of the Related Art

An image forming apparatus forms an image printed on paper. The image forming apparatus may be realized by a printer, a copy machine, a fax, a multi-functional device having two or more functions, etc.

In recent years, there has been an increasing demand for an image forming apparatus as office automation equipment such as a multi-functional device which not only serves a printing function to output a document but also functions as a scanner, a fax, or the like. Thus, the image forming apparatus is being gradually developed into a high-performance device by expanding its own functions to carry out a variety of roles, and available functions of the image forming apparatus may be limited by authority of a user which is set up.

Accordingly, an image forming apparatus sets up a driver of the image forming apparatus installed in each client differently and controls them through a system administrator in order to efficiently control an image forming system including at least one client PC (a host device) connected via a network according to authority of a user.

Specifically, the system administrator, i.e., a server PC, has access to each client in a remote mode to carry out remote installation, e.g., to distribute and install or to delete software such as a driver.

However, in a conventional process of remotely installing software, a server transmits an installation command unilaterally to conduct remote installation without considering status information of each client, so that already installed software may be installed again in a client.

Further, since the server may not identify that an installation condition of software to be installed does not correspond to an environment of a client, the server transmits an installation command unilaterally to carry out remote installation, resulting in installation failure.

Accordingly, time and resources are uselessly wasted owing to the server's unilateral remote installation in a client where installation is not needed or is impossible.

SUMMARY

Accordingly, exemplary embodiments of the present general inventive concept provide a server connected to an image forming apparatus, one client which receives status information of another client to install a driver in and selectively installs the driver according to the status information to save time and cost involved in unnecessary installation, a client, and a method of remotely installing a driver of the image forming apparatus.

Additional features and utilities of the present general inventive concept will be set forth in part in the description which follows and, in part, will be obvious from the description, or may be learned by practice of the general inventive concept.

Exemplary embodiments of the present general inventive concept may provide a server connected to an image forming apparatus and a client which filters and displays installation information depending on whether a driver is installable according to received status information to provide convenience to a system administrator, a client, and a method of remotely installing a driver of the image forming apparatus.

Exemplary embodiments of the present general inventive concept may also provide a method of remotely installing a driver of an image forming apparatus in which a server is connected to at least one image forming apparatus and at least one client, the method including selecting at least one client where a driver of the image forming apparatus to be installed, selecting a kind of at least one driver to be installed in the selected at least one client, receiving status information from the selected at least one client, displaying installation information of the driver on the selected at least one client according to the status information, and selectively installing the driver in the selected at least one client according to the display installation information.

The status information may include at least one of whether the selected driver is installable in the selected at least one client, whether the selected driver is previously installed in the selected at least one client, and whether to satisfy a minimum installation condition.

The status information may further include at least one of information about an operating system of the selected at least one client, information about a web browser, information about available space to store data, hardware information, information about a previously installed driver, and whether to update the driver.

The displaying the installation information may include filtering and displaying the installation information of the selected at least one client according to at least one of the received status information and the kind of the driver.

The filtering and displaying may include filtering and displaying a client where the selected driver is installable in the selected at least one client.

The filtering and displaying may include filtering and displaying whether the kind of driver is installable.

The method may further include displaying a message on the selected at lest one client to agree with installation of the driver, and receiving a selection to agree or disagree to install the driver.

The method may further include comparing the received status information with stored information of the selected at least one client and updating the stored information of the selected at least one client according to the comparison.

If a plurality of clients are selected in the selecting at least one client, the displaying the installation information may include displaying installation information of the selected plurality of clients, and determining the kind of a driver to be installed in each of the selected plurality of clients according to the displayed installation information.

The method may further include installing an installing manager to install the driver in the at least one selected client, wherein the receiving the status information and the selectively installing the driver may use the installing manager.

The selecting the client may include setting up a group including the selected at least one client.

Exemplary embodiments of the present general inventive concept may also provide a server which is connected to at least one image forming apparatus and at least one client including a communication unit to communicate with the at least one image forming apparatus and the at least one client; a display, a user input unit to receive a selection of at least one client where an driver of the image forming apparatus is installed among the at least one client and to receive a selection of a kind of at least one driver installed in the selected at least one client, and a controller to control the communication unit to receive status information from the selected at least one client, to control the display to display installation information of the driver in the selected client according to the received status information, and to control the communication unit to transmit a command to selectively install the driver in the selected at least one client to the at least one client according to the installation information.

The status information may include at least one of whether the selected driver is installable in the selected at least one client, whether the selected driver is previously installed, and whether to satisfy a minimum installation condition.

The status information may further include at least one of information about an operating system of the selected at least one client, information about a web browser, information about available space to store data, hardware information, information about a previously installed driver, and whether to update the driver.

The display may filter and display the installation information of the selected at least one client according to at least one of the received status information and the kind of the driver.

The display may filter and display a client where the selected driver is installable among the selected at least one client.

The server may further include a storage unit to store information of the at least one client, wherein the controller may compare the status information with the stored information of the client and update the stored information of the client.

If the user selection unit select a plurality of clients, the display may display installation information of the clients, and the controller may determine the kind of a driver to be installed in each of the clients.

Exemplary embodiments of the present general inventive concept may also provide a client connected to at least one image forming apparatus and a server including a communication unit to communicate with the at least one image forming apparatus and the server, a storage unit to store status information of the client and information of a previously installed driver, and a controller to receive a command to request the kind of a driver of the image forming apparatus to be installed in the client and the status information of the client through the communication unit from the server, to compare the received information with the information in the storage unit, and to control the communication unit to transmit whether the driver is installable and the kind of an installable driver to the server.

The client may further include a user input unit to receive a command, and a display, wherein the controller may control the communication unit to receive a driver installation command from the server and control the display to display a message and receive a selection of whether to install the driver.

Exemplary embodiments of the present general inventive concept also provide a method of remotely installing a driver of an image forming apparatus that is communicatively coupled to at least one image forming apparatus and at least one client, the method including receiving a selection of a client where a driver of the image forming apparatus is to be installed, receiving status information from the selected client, and installing the driver in the selected client according to the received status information.

The method may include receiving a selection of a kind of driver to be installed on the selected client, where the installing the driver in the selected client includes installing the driver according to the received status information and the received selection of the kind of driver.

The method may include determining an amount that the driver is installed on the selected client, and displaying the determined amount that the driver is installed on the selected client with a display device.

The method may include comparing the received status information with stored information of the selected client, and updating the stored information of the selected client according to the comparison.

The method may include receiving a selection of a group that includes the selected client.

Exemplary embodiments of the present general inventive concept may also provide a sever communicatively coupled to an image forming apparatus and at least one client, the server including an interface to receive a selection of a client where a driver of the image forming apparatus is to be installed, a communication unit to receive status information from the selected client, and a controller to control the installation of the driver in the selected client according to the received status information.

The server may include where the communication unit receives a selection of a kind of driver to be installed on the selected client, and the controller to control the installation of the driver in the selected client installs the driver according to the received status information and the received selection of the kind of driver.

The server may include where the controller determines an amount that the driver is installed on the selected client, and displays the determined amount that the driver is installed on the selected client on a display device.

The server may include where the controller compares the received status information with stored information of the selected client that is stored in a storage device coupled to the server, and controls the update of the stored information of the selected client according to the comparison.

The server may include where the interface receives a selection of a group that includes the selected client.

Exemplary embodiments of the present general inventive concept may also provide a client communicatively coupled to an image forming apparatus and a server, including a storage device to store at least one of a driver program and status information, a communication interface to transmit status information when requested by the server, and a controller to control the installation of a driver received by the communication interface on the client.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
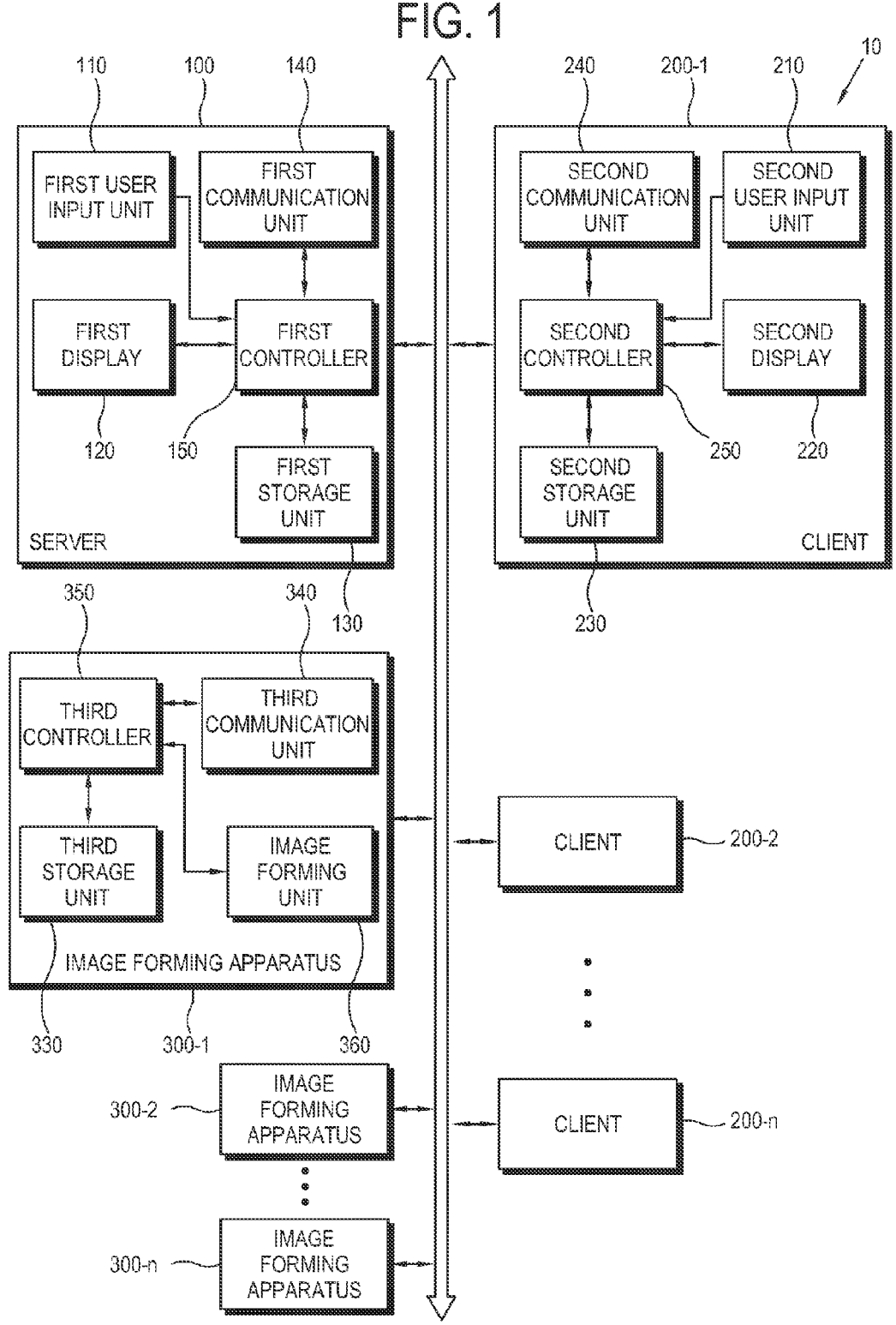
FIG. 1 is a block diagram schematically illustrating an image forming system according to exemplary embodiments of the present general inventive concept.

Below, exemplary embodiments of the present general inventive concept will be described in detail with reference to accompanying drawings so as to be easily realized by a person having ordinary knowledge in the art. The exemplary embodiments or the present general inventive concept may be embodied in various forms without being limited to the exemplary embodiments set forth herein. Descriptions of well-known parts are omitted for clarity, and like reference numerals refer to like elements throughout. The embodiments are described below in order to explain the present general inventive concept by referring to the figures.

FIG. 1 schematically illustrates a configuration of an image forming system 10 according to exemplary embodiments of the present general inventive concept.

As illustrated in FIG. 1, the image forming system 10 according to exemplary embodiments of the present general inventive concept includes a server 100, at least one client 200-1, 200-2, . . . , and 200-n, and at least one image forming apparatus 300-1, 300-2, . . . , and 300-n.

One or more of the server 100 and/or the client 200-1, 200-2, . . . , and 200-n can be a host device (e.g., a PC (Personal Computer), smartphone, cellular phone, tablet computer, personal digital assistant, processor, and/or any other suitable computing device to carry out the exemplary embodiments of the present general inventive concept disclosed herein), and the image forming apparatus 300-1, 300-2, . . . , and 300-n can include an image forming unit 360 and can be a printer connected via a wired and/or wireless network, local network, universal serial bus (USB), parallel interface, universal naming convention (UNC), or a multifunctional device serving at least two functions.

A printing operation can include printing a scanned document to provide a copy of the document, printing a received fax data, and printing a data received from the outside via a host device including a server, a hard disk drive (HDD) of the image forming apparatus 300-1, 300-2, . . . , and 300-n, or an external memory (e.g., USB memory), or from any other suitable apparatus and/or storage device to carry out the exemplary embodiments of the present general inventive concept as disclosed herein.

The image forming apparatus 300-1, 300-2, . . . , and 300-n, as illustrated in FIG. 1, may include a third storage unit 330 to store setup information and/or data such as a print data, a third communication unit 340 to communicate with the server 100 (e.g., via a wired or wireless communication network) and at least one client 200-1, 200-2, . . . , and 200-n, and a third controller 350 to control at least one operation of the image forming apparatus 300-1, 300-2, . . . , and 300-n.

If a plurality of clients are provided, a user can log into one or more of the clients 200-1, 200-2, . . . , and 200-n individually to use the image forming apparatus 300-1, 300-2, . . . , and 300-n.

A user may log into one of the clients 200-1, 200-2, . . . , and 200-n in an administrator mode to set up and/or change one or more configurations of the image forming apparatus 300-1, 300-2, . . . , and 300-n without any limitation on access.

A client that is logged into in the administration mode may remotely access another client and may remotely install software, such as a driver of the image forming apparatus 300-1, 300-2, . . . , and 300-n, in the client. Accordingly, the client that the user is logged into in the administration mode may function as the server 100.

The server 100 of the present general inventive concept can select at least one client of the clients 200-1, 200-2, . . . , and 200-n to install a driver in, and can install the driver in the selected at least one client. In exemplary embodiments of the present general inventive concept, one or more of the clients 200-1, 200-2, . . . , and 200-n can be logged into in the administration mode by a user, and a client that is logged into in the administration mode may become the server 100. A driver may be remotely installed for a plurality of selected clients (e.g., a plurality of clients selected at once).

The image forming apparatus 300-1, 300-2, . . . , and 300-n may be locally connected to any one of the server 100 and the clients 200-1, 200-2, . . . , and 200-n via a wired and/or wireless communication network, and/or may be shared in a network as a network image forming apparatus having an independent IP (Internet protocol) address.

As illustrated in FIG. 1, the server 100 can include a first user input unit 110, a first display 120, a first storage unit 130, a first communication unit 140, and a first controller 150, and the client 200-1, 200-2, . . . , and 200-n can include a second user input unit 210, a second display 220, a second storage unit 230, a second communication unit 240, and a second controller 250.

Here, as for the server 100 and the client 200-1, 200-2, . . . , and 200-n, it should be noted that components performing the same function can have the same designation, and description thereof is commonly applied to the server 100 and the client 200-1, 200-2, . . . , and 200-n.

The first user input unit 110 and the second user input unit 120 can receive instructions (e.g., a user instruction) from the server 100 and the client 200-1, 200-2, . . . , and 200-n, respectively.

The first user input unit 110 can receive a user's instruction to select at least one client of the plurality of clients 200-1, 200-2, ..., and 200-n to install a driver and can determine the kind of a driver to be installed in the selected at least one client.

Specifically, a group can be set to include at least one client of the plurality of clients 200-1, 200-2, ..., and 200-n to install a driver on using the first display 120 and the first user input unit 110, and to select the kind (e.g., type) of a driver to be installed in the setup group. Here, setting up a group can include at least one of creating, adding, loading, editing, and deleting a group.

The first user input unit 110 can receive an administrator ID and a password to login in the administrator mode from a user. The first controller 150 can confirm the user as a system administrator by comparing the received input (e.g., from the first user input unit 110) with an administrator ID and password.

The first user input unit 110 can include a keyboard, a mouse, etc., which are provided as an input device of the server 100, and may include graphic user interface (GUI, hereinafter, also referred to as "local user interface (LUI)") generated by execution of a driver and/or an application program by the server 100 and displayed on the first display 120.

If the first user input unit 110 includes a GUI, the server 100 can display a GUI to receive a selection of at least one of the clients 200-1, 200-2, ..., and 200-n and can receive an instruction to set up a group including the selected at least one client using the GUI.

The first display 120 can display a setup screen to set up a group including at least one of the clients 200-1, 200-2, ..., and 200-n, status information received from each of the clients 200-1, 200-2, ..., and 200-n, installation information according to the status information and the kind of a selected driver, installation state of the driver in each client, etc.

Specifically, the first display 120 can display the plurality of clients 200-1, 200-2, ..., and 200-n in the image forming system 10 to be selected, can display status information received from at least one selected client and installation information according to the status information and the kind of a selected driver to a user via filtering, and can display an installation state of the driver in each client.

A user can select the kind and/or type of a driver to be installed in a group through the first user input unit 110 in accordance with a client group setup screen including at least one client displayed on the first display 120. That is, the first user input unit 110 may receive a selection of a driver to be installed in a selected group. The server 100 can transmit an installation program corresponding to a driver according to the kind of the driver to each client in the group.

The first display 120 may include a thin film transistor-liquid crystal display (TFT-LCD), a light emitting diode (LED) display, and a driver (not illustrated) to drive the TFT-LCD or LED display, or any other suitable display and/or driver to carry out the exemplary embodiments of the present general inventive concept.

Figure 2:
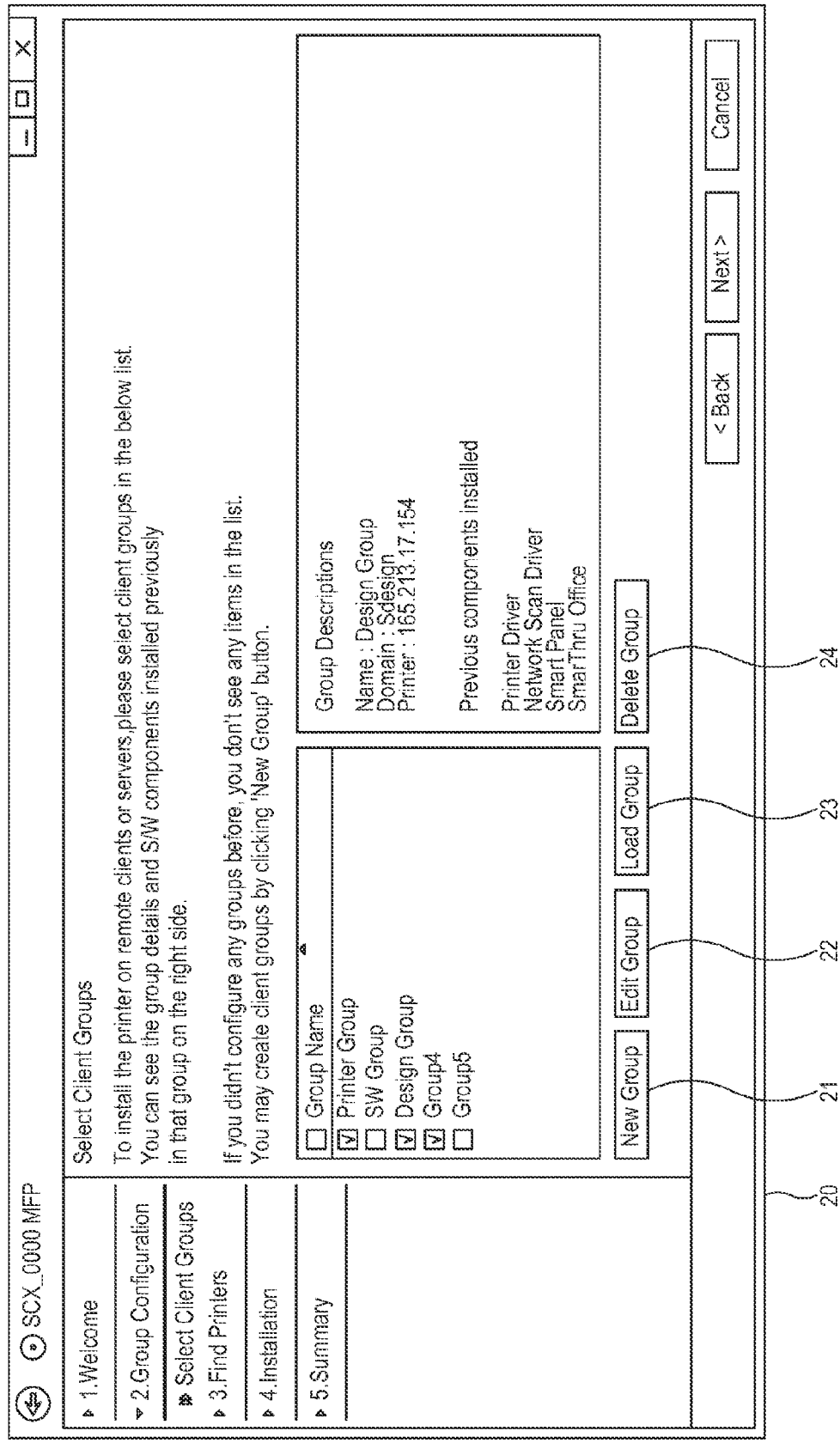
FIGS. 2 to 4 illustrate examples of group setup screen according to exemplary embodiments of the present general inventive concept.
Figure 3:
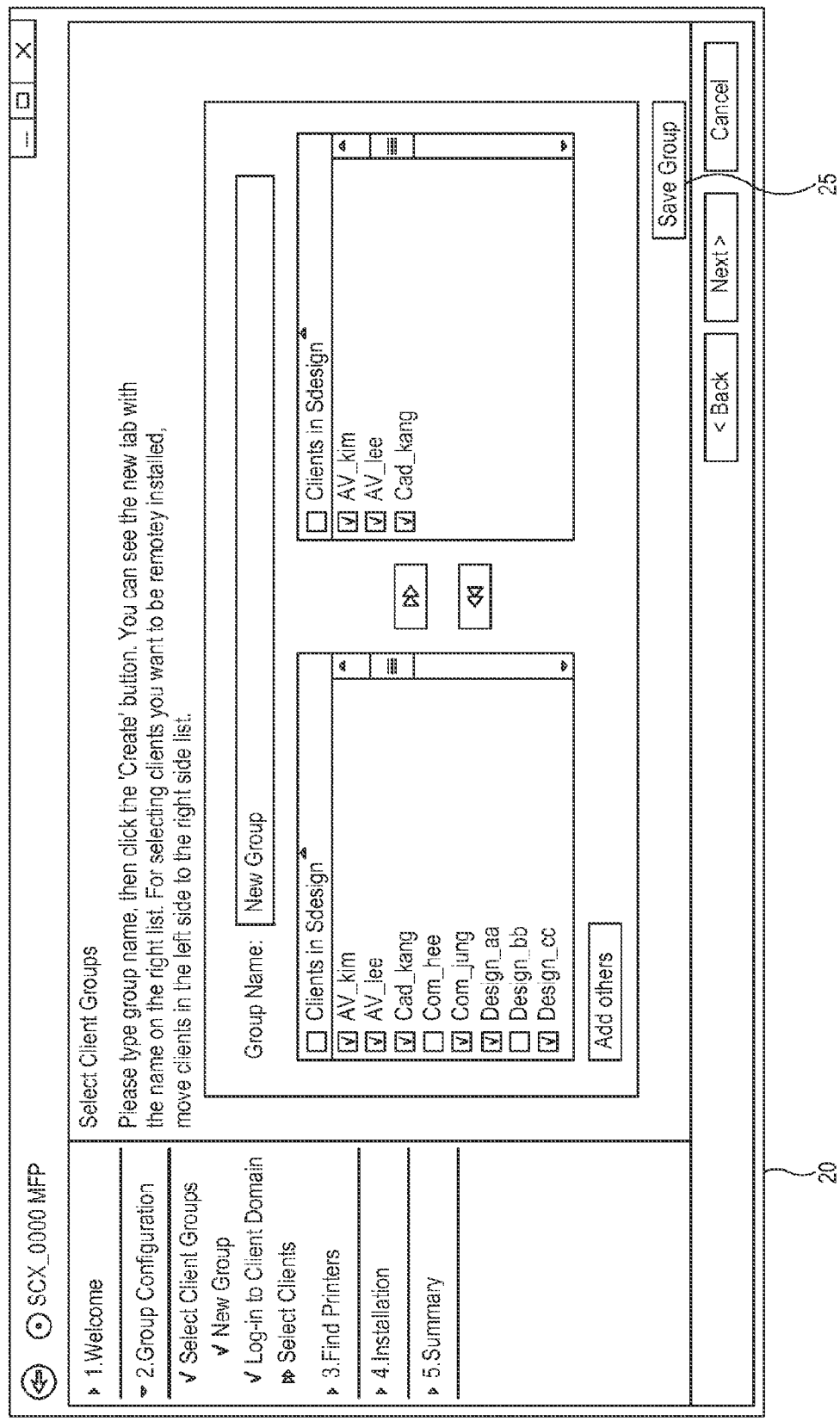
Figure 4:
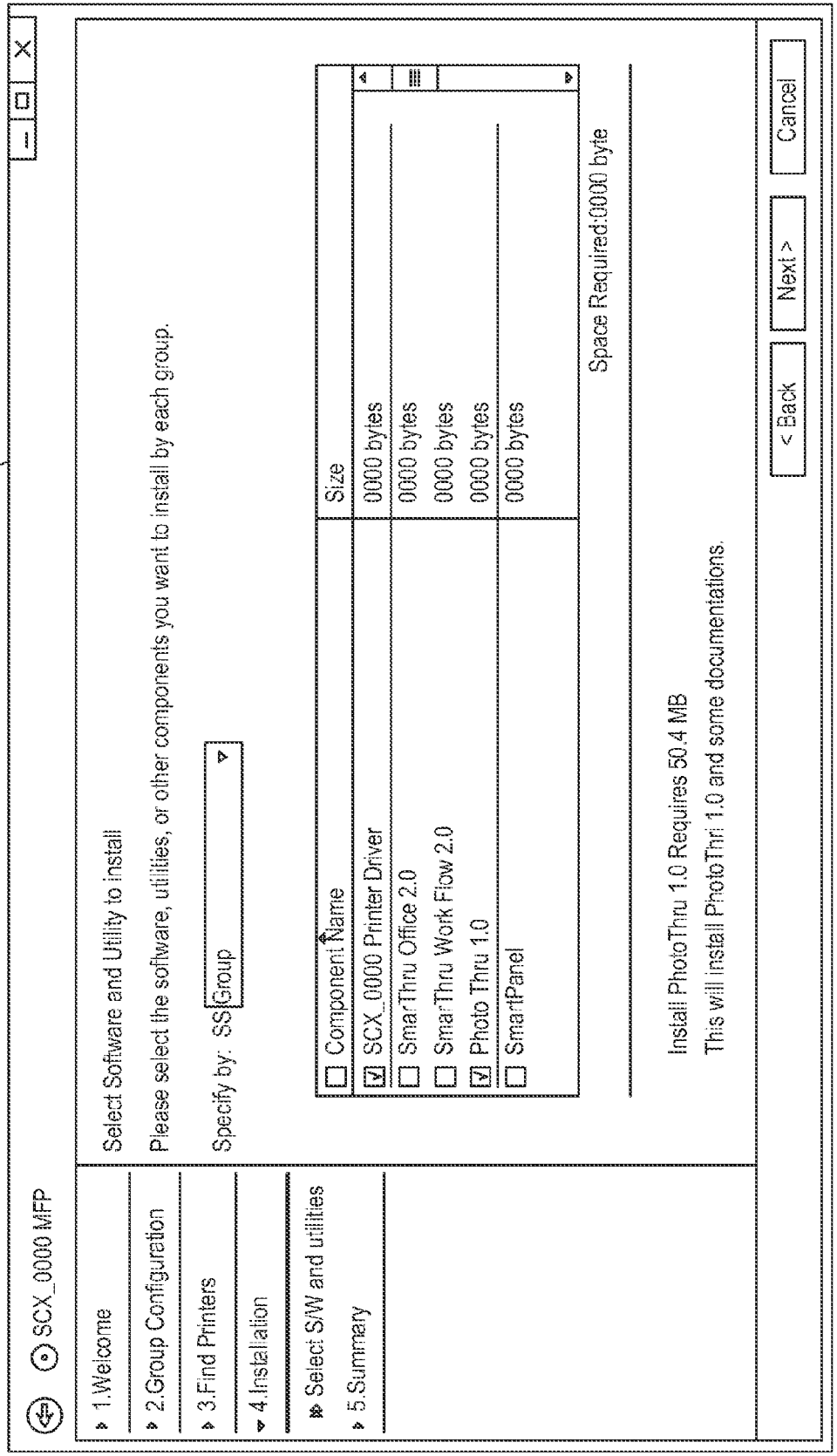

FIGS. 2 to 4 illustrate examples of a group setup screen 20 according to exemplary embodiments of the present general inventive concept.

As illustrated in FIG. 2, the first display 120 can display the setup screen 20 to select a group to be set up to a user. Specifically, when a user selects a group setup menu, the first controller 150 can display information about a preset group to the user. The group information displayed can include, for example, a group name, a domain, information about an available image forming apparatus 300-1, 300-2, ..., and 300-n for a corresponding group (i.e., IP address of the available image forming apparatus), information about a driver (i.e., kind and/or version), etc.

The user can create, add, edit, and/or delete a new group through the setup screen 20 of FIG. 2. The user can use group information already stored in the first storage unit 130 and/or use any information provided by a user and/or from other storage devices when setting up a group. The stored group information can include information about a client included in a group, installation information of a driver in each client, etc. The server 100 of the present general inventive concept may load group information stored in the first storage unit 130 and/or in other client devices, and display it on the first display 120.

The group setup screen displayed may include UI buttons 21, 22, 23, and 24 corresponding to creating (or adding) a group (e.g., new group button 21), editing (revising) a group (e.g., edit group button 22), loading a group (e.g., load group button 23), and deleting a group (e.g., delete group 24), respectively.

In FIG. 2, if it is selected to create a new group (e.g., the new group button 21 is selected), the first display 120 can display a computer name of at least one client included a generated group, and the user can select a client included in the generated group using the first user input unit 110. That is, the user input unit 110 can receive a selection of client of a generated group.

When completing selection of a client, the user can store information about the generated group using the UI button 25 (e.g., save group button 25) corresponding to saving the group as illustrated in FIG. 3.

The first display 120 can display a setup screen 20 to select the kind of a driver to be installed in a set-up group, as illustrated in FIG. 4. According to exemplary embodiments the present general inventive concept, a driver can include a printer driver to control the image forming apparatus 300-1, 300-2, ..., and 300-n in accordance with the kind of driver, one or more applications, software (S/W), web solutions, etc. to expand functions of the image forming apparatus 300-1, 300-2, ..., and 300-n.

The exemplary embodiments of the present general inventive concept as illustrated in FIGS. 2 to 4 have been explained with an example of setting up a client group including at least one client. In example embodiments of the present general inventive concept, at least one client where a driver is installed may be selected (e.g., by a least one user) to carry out remote installation.

The group information set up illustrated in FIGS. 2 to 4 can be stored in the first storage unit 130. The first storage unit 130 may be internal and/or external storage module devices such as a HDD, a flash memory, etc. The first storage unit 130 may store authorization information to confirm an administrator mode.

The first storage unit 130 may store information about at least one connectable client 200-1, 200-2, ..., and 200-n, and the first controller 150 may compare status information received via the first communication unit 140, as discussed below, with the pre-stored client information and may update the pre-stored client information.

The first communication unit 140 can communicate with at least one client included in a corresponding group with reference to the setup group information.

The server 100 can transmit an instruction to a client selected to be included in a corresponding group to install a driver and can transmit and/or receive status information about driver installation to and/or from one or more clients (e.g., each client) when transmitting and/or receiving data to and/or from the one or more clients (e.g., each client) via the first communication unit 140.

The server 100 can receive status information from at least one client included in the group selected in FIG. 3 and installation information of a driver in a client selected according to the status information.

Figure 5:
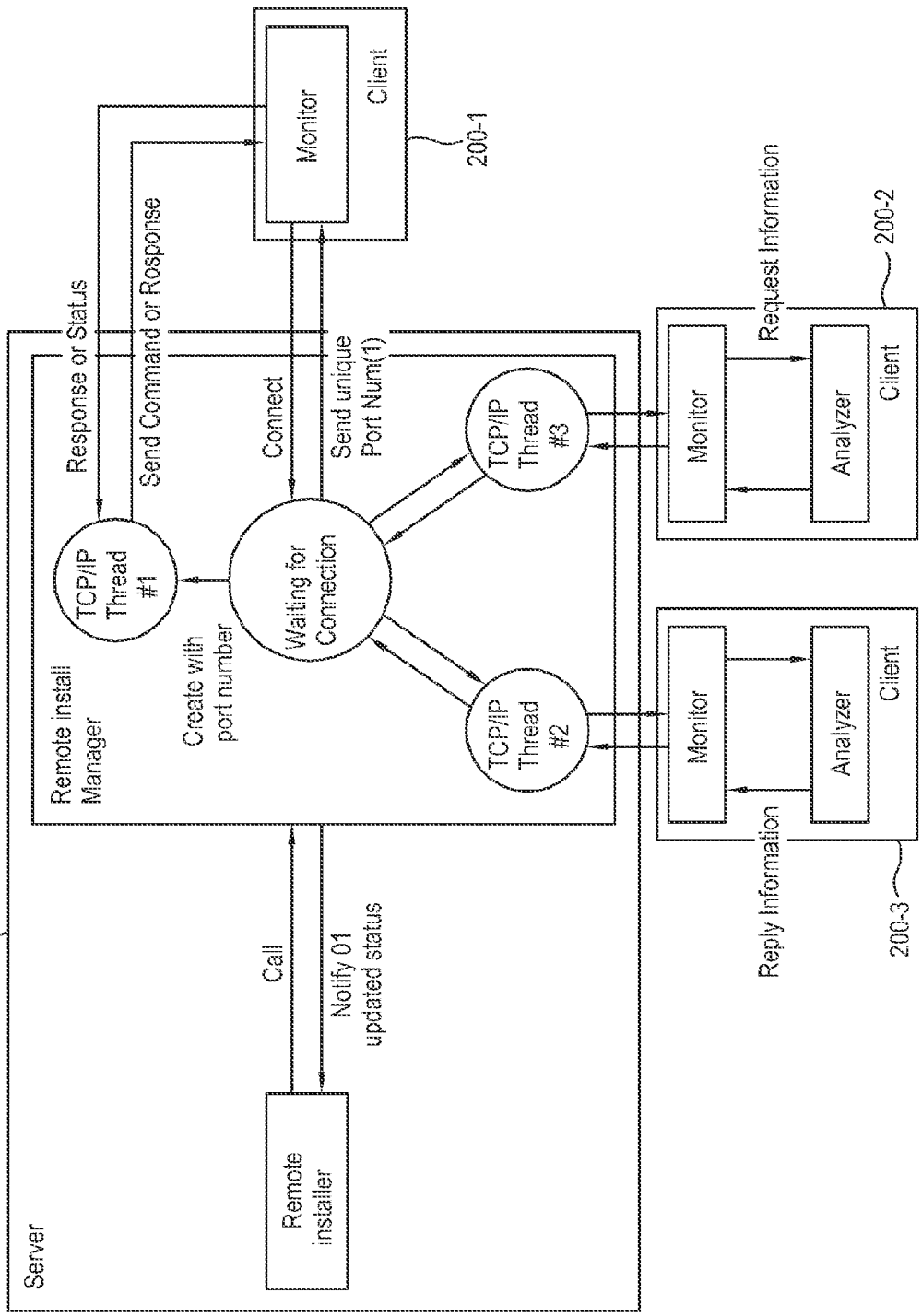
FIG. 5 illustrates sending and receiving data between a server and a client according to exemplary embodiments of the present general inventive concept.

As illustrated in FIG. 5, an installing manager may be installed in the server 100 and one or more clients (e.g., each client) 200-1, 200-2, . . . , and 200-n as a monitoring program to transmit and receive data including information to remotely install a driver and status information.

Accordingly, the server 100 can transmit and/or receive status information using the installing manager and can remotely install a driver when conducting data transmission and/or reception with at least one client 200-1, 200-2, . . . , and 200-n according to a protocol, and the client 200-1, 200-2, . . . , and 200-n can transmit its status information with the installing manager to the server 100 and can receive an installation program for remote installation.

The installing manager can be an agent to carry out a connection between the server 100 and one or more clients (e.g., each client) 200-1, 200-2, . . . , and 200-n and transmission and reception of data such as one or more instructions (commands), status information, installation programs, etc. An installing manager installed in the server 100 can be a remote installing manager.

An installing manager can be installed in the client 200-1, 200-2, . . . , and 200-n that includes a monitor and an analyzer to explore an installation configuration of the client, and can transmit status information to the server 100 by checking installation configuration of the client according to a command received through an installing manager in the server 100.

The first communication unit 140 may be a cable and/or wireless communication module connected locally or via a network according to a protocol to an external device, e.g., the image forming apparatus 300-1, 300-2, . . . , and 300-n and the client 200-1, 200-2, . . . , and 200-n.

The first controller 150 can control the server 100. The first controller 150 can control the first display 120 to display a setup screen to receive a selection of at least one client where a driver of the image forming apparatus 300-1, 300-2, . . . , and 300-n can be installed, i.e., a group setup screen.

When a user selects at least one client included in a group on the setup screen using the first user input unit 110 and selects the kind of a driver to be installed in the group including the selected client, the first controller 150 can transmit a command to request status information to the selected client, i.e., the client included in the group.

The server 100 can transmit and receive instructions and/or status information to and/or from one or more client (e.g., each client) included in the group and may include an installing manager to remotely install a driver, i.e., a monitor. The monitor may be added as a separate component or included in the first controller 150.

Here, a command transmitted to the selected client from the server 100 may be one of SCAN[ALL], SCAN[SW], and SCAN[SW+VER], as described below.

SCAN[ALL] can be a command to explore an operating system (OS) version of the selected client, an installed driver (including software), available storage capacity, etc. and to transmit them to the server 100. SCAN[SW] can be a command to compare software installed in the selected client, i.e., a driver list, with a driver list selected in the server 100 and to transmit the driver list previously installed in the client to the server 100. SCAN[SW+VER] can be a command to compare a driver list installed in the selected client with a driver list selected in the server 100 and, if the installed driver exists, to extract its version information and transmit the driver list installed in the client and the version information to the server.

The client can receive one or more commands requesting status information from the server 100, can extract status information of the client, and can transmit scan results of client's environment in a format of, e.g., [OS:Version, AvailableHDD:avilable_size(MB), IE:Version, NoOfInstalledSW:the number of installed S/W], [SW(1):software name, version, (Installed or Update or Install), [SW(n):software name, version, and (Installed or Update or Install)] to the server 100.

Here, the status information transmitted from the client to the server 100 may include information about whether a selected driver is installable or not, such as [STATUS:Fail, CLIENT_ENVIR:, MSG:Message]. For example, [STATUS:Fail, CLIENT_ENVIR:, MSG:shortages of storage] can indicate that a driver is not allowed to be installed owing to shortage of storage capacity of the client.

For this, the client can extract the status information using registry information, as described below, and can transmit it to the server 100.

The first controller 150 can receive the foregoing status information from the client and can control the first display 120 to display installation information of the driver according to the status information. According to the displayed installation information, the controller can determine the kind (e.g., type) of a driver to be installed in one or more clients (e.g., each client) and can remotely install a driver.

A command directing remote installation of a driver can be in a format such as [C:\Temp\Setup.exe/s/p10.10.10.10/] so that an executable file and a parameter may be designated. Here, "/s" can be a command to conduct remote installation in a silent mode, and thus if "/s" is not designated, remote installation can be carried out in a normal mode. In the silent mode, copy of an installation program and installation operations can be conducted in a background of a client, so that a user using the client may not recognize them.

Here, the first controller 150 can transmit one of EXECUTE[MSG+START], EXECUTE[MSG+START+END], and EXECUTE[MSG+END] as a command to remotely install a driver to the selected client.

EXECUTE[MSG+START] can be a command displaying a message (i.e., a dialog box) to accept or refuse to start remote installation on the selected client before initiating remote installation and executing remote installation when the user accepts on the client, and may designate an executable file a parameter like [C:\Temp\Setup.exe/s/p10.10.10.10/].

EXECUTE[MSG+START+END] can be a command displaying a message (i.e., a dialog box) to accept or refuse to start remote installation on the selected client before initiating remote installation, executing remote installation when the user accepts on the client and displaying an installed driver (S/W) list on the client when completing installation, and may designate an executable file a parameter.

EXECUTE[MSG+END] can be a command to display an installed driver (S/W) list on the client when completing remote installation and may designate an executable file parameter.

When receiving such commands for remote installation, the selected client can execute remote installation and can transmit an installation state to the server 100 in real time using the installing manager. Here, the installation state transmitted to the server 100 from the client may include information indicating [STATUS:Installing, COMPONENT:Component Name, INDEX:index of component, TOTAL:total number of components] as installing, [STATUS:Complete, COMPONENT:Component Name, INDEX:index of component, TOTAL:total number of components] as success, [STATUS:Fail, COMPONENT:Component Name, INDEX:index of component, TOTAL:total number of components] as failure, and may be displayed in, for example, [STATUS:Installing, COMPONENT:SmarThru, INDEX:2, TOTAL:5].

In the image forming system 10 illustrated in FIG. 1, each client can receive one or more instructions on remote installation of a driver from the server 100, can transmit its environment and status information to the server 100, and can execute installation of a driver determined by control of the server 100. An installing manager can be installed as a monitoring program (or agent program) in one or more clients (e.g., each client), and it can regularly transmit (e.g., at predetermined intervals and/or at predetermined times, etc.) status information (environment information) and installation information of each client to the server 100.

When receiving an instruction on installation of a driver from the server 100, the second user input unit 210 of the client 200-1, 200-2, . . . , and 200-n can be input with a user's selection about agreement on installation of a driver displayed in the second display 220.

The second display 220 can display a message so that the user can select whether to agree to installation of the driver or not and, when completing remote installation of the driver using the server 100, can display a message indicating whether to complete the installation to the user.

The second storage unit 230 can store status information of the client 200-1, 200-2, . . . , and 200-n. Here, the status information can include at least one of whether a selected driver may be installed, whether a selected driver is previously installed, whether to satisfy a minimum installation condition, information about an OS of a client, information about a web browser, information about available space, hardware information, information about a previously installed driver, and whether to update.

The second communication unit 230 can communicate with the server 100 and the image forming apparatus 300-1, 300-2, . . . , and 300-n via a network.

That is, the second communication unit 230 can receive an instruction requesting status information from the server 100 and can transmit status information from a driver installing environment in the client analyzed according to the received instruction to the server 100. The second communication unit 230 can receive an instruction on installation of a driver from the server 100 and can install the corresponding driver in the client in accordance with the transmitted status information.

The second controller 250 can control the operation of the client 200-1, 200-2, . . . , and 200-n. Specifically, the second controller 250 can control the second communication unit 230 to transmit status information from an analyzed environment of the client to the server 100 and can receive an installation file about a driver from the server 100 to install the corresponding driver in the client 200-1, 200-2, . . . , and 200-n corresponding to a command received from the server 100.

For this, the client 200-1, 200-2, . . . , and 200-n may include an installing manager which can be a monitor detecting a command received from the server 100 and an analyzer to explore an installation configuration of the client. The monitor and the analyzer may be added as separate components and/or included in the second controller 250.

Figure 6:
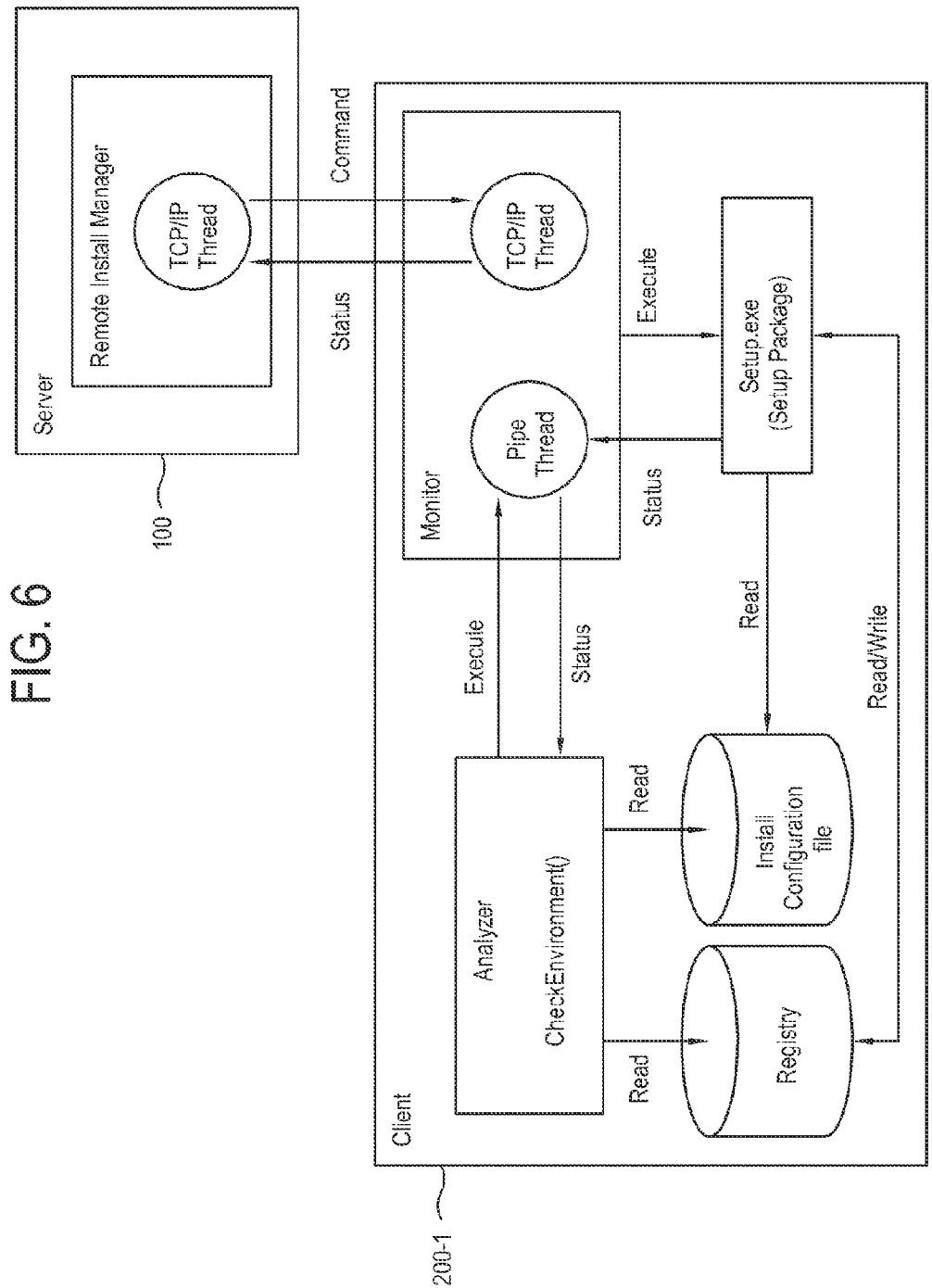
FIG. 6 illustrates a client according to exemplary embodiments of the present general inventive concept.

FIG. 6 illustrates an operation of a client 200-1 according to exemplary embodiments of the present general inventive concept.

As illustrated in FIG. 6, the client 200-1 can receive one or more commands from the server 100 and can transmit status information of the client 200-1 to the server 100 in accordance with a received command.

When a monitor monitors transmitted and received data and detects reception of a command of requesting state information, an analyzer can analyze an installation environment of the client 200-1 with reference to information about configuration files of software such as registry information and a driver. The monitor can transmit status information corresponding to the installation environment analyzed by the analyzer to the server 100.

Here, the registry information and the information about configuration files can be stored in the second storage unit 130.

Figure 7:
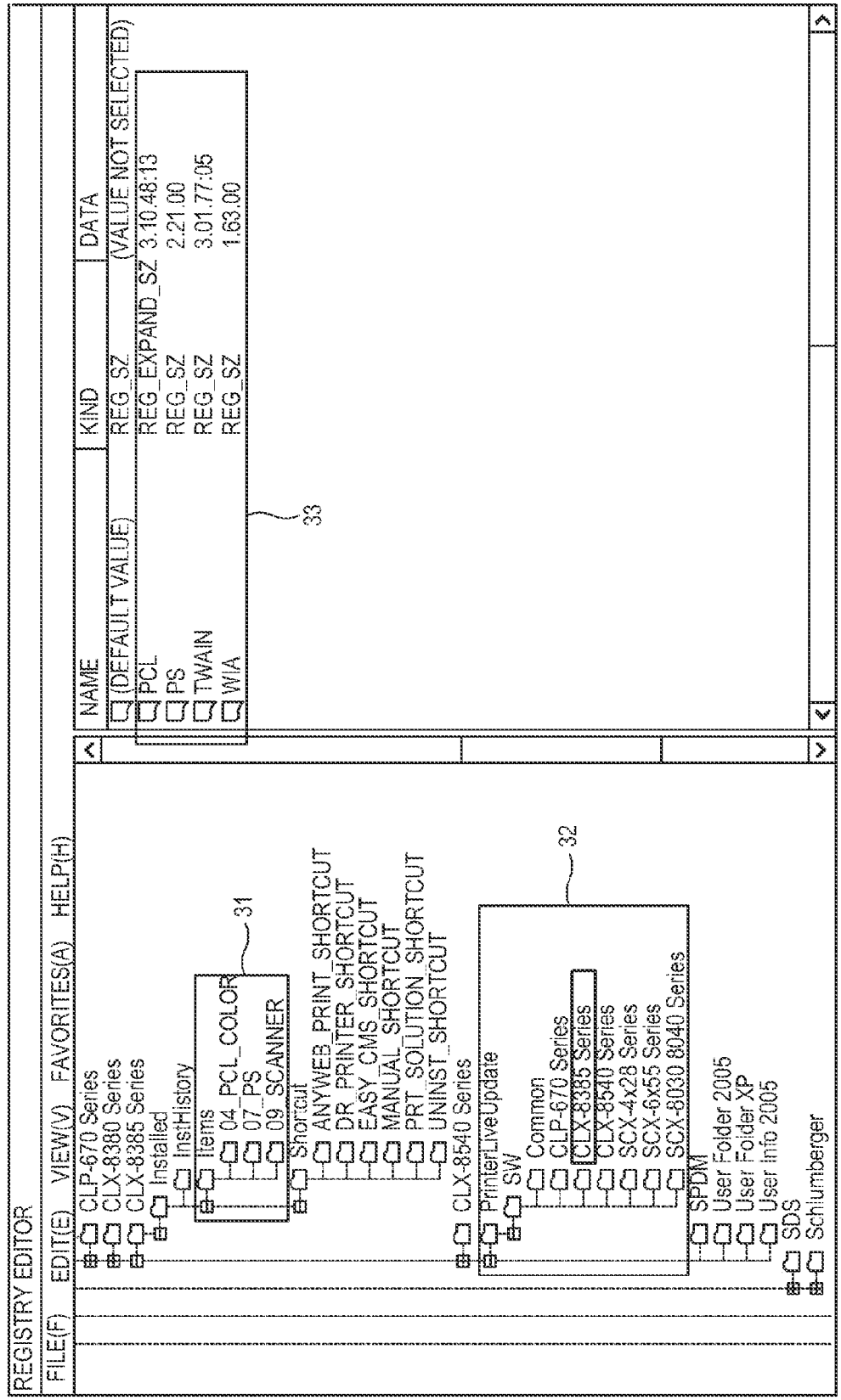
FIG. 7 illustrates an example of registry information of a client according to exemplary embodiments of the present general inventive concept.

FIG. 7 illustrates an example of registry information of a client 200-1 according to exemplary embodiments of the present general inventive concept.

As illustrated in FIG. 7, the registry information can include information about installed software, i.e., driver information 31, registry key information 32 to confirm a version of the installed software, and version information 33 of the installed software, and any other suitable information to carry out the exemplary embodiments of the present general inventive concept as disclosed herein.

An analyzer can analyze status information of the client 200-1 using at least a portion of the registry information.

The client 200-1 can transmit analyzed status information to the server 100, and the server 100 can display installation information about the driver selected in FIG. 3 according to the status information transmitted from the client 200-1 on the first display 120.

Figure 8:
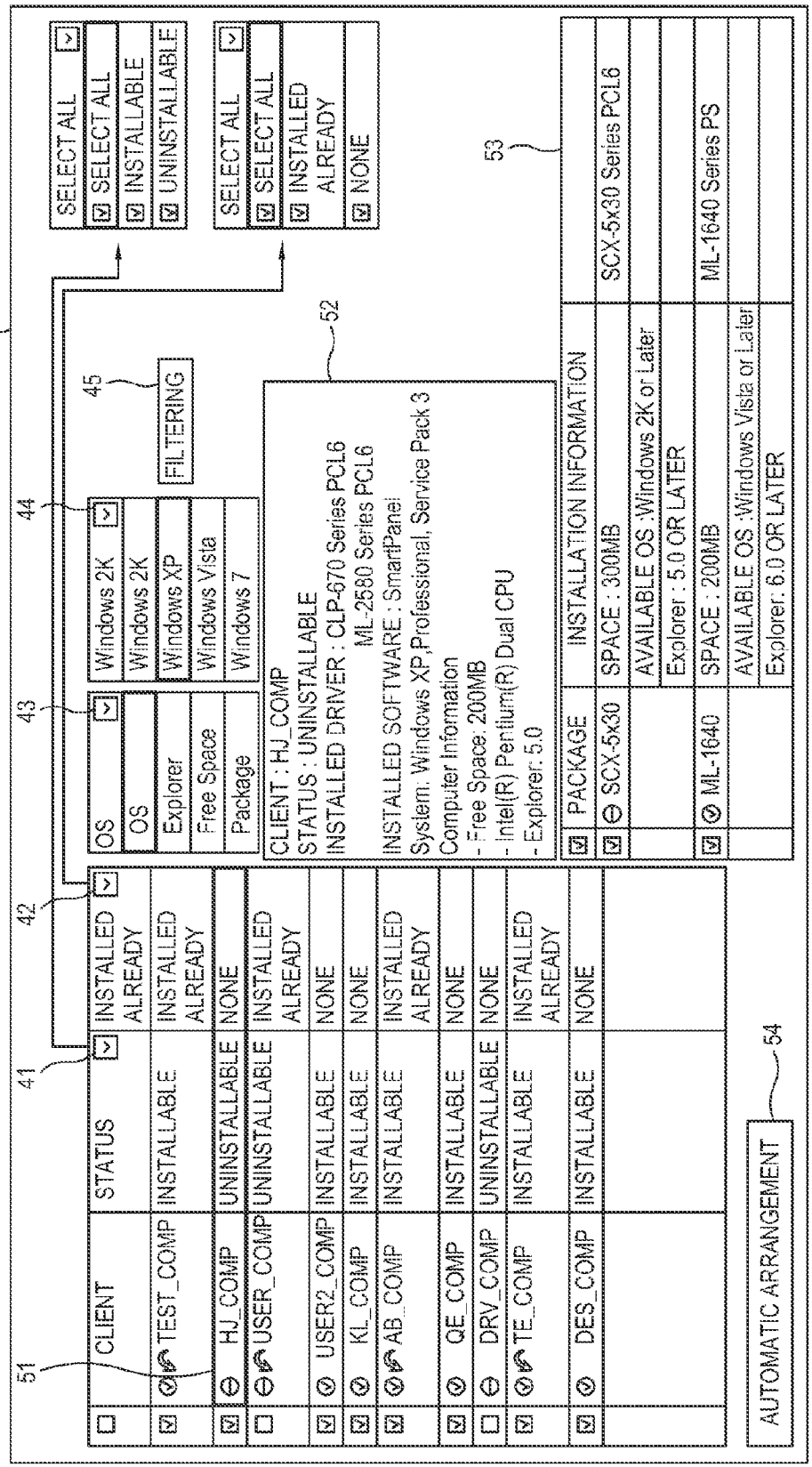
FIGS. 8 and 9 illustrate an installation information screen displayed by a server according to exemplary embodiments of the present general inventive concept.
Figure 9:
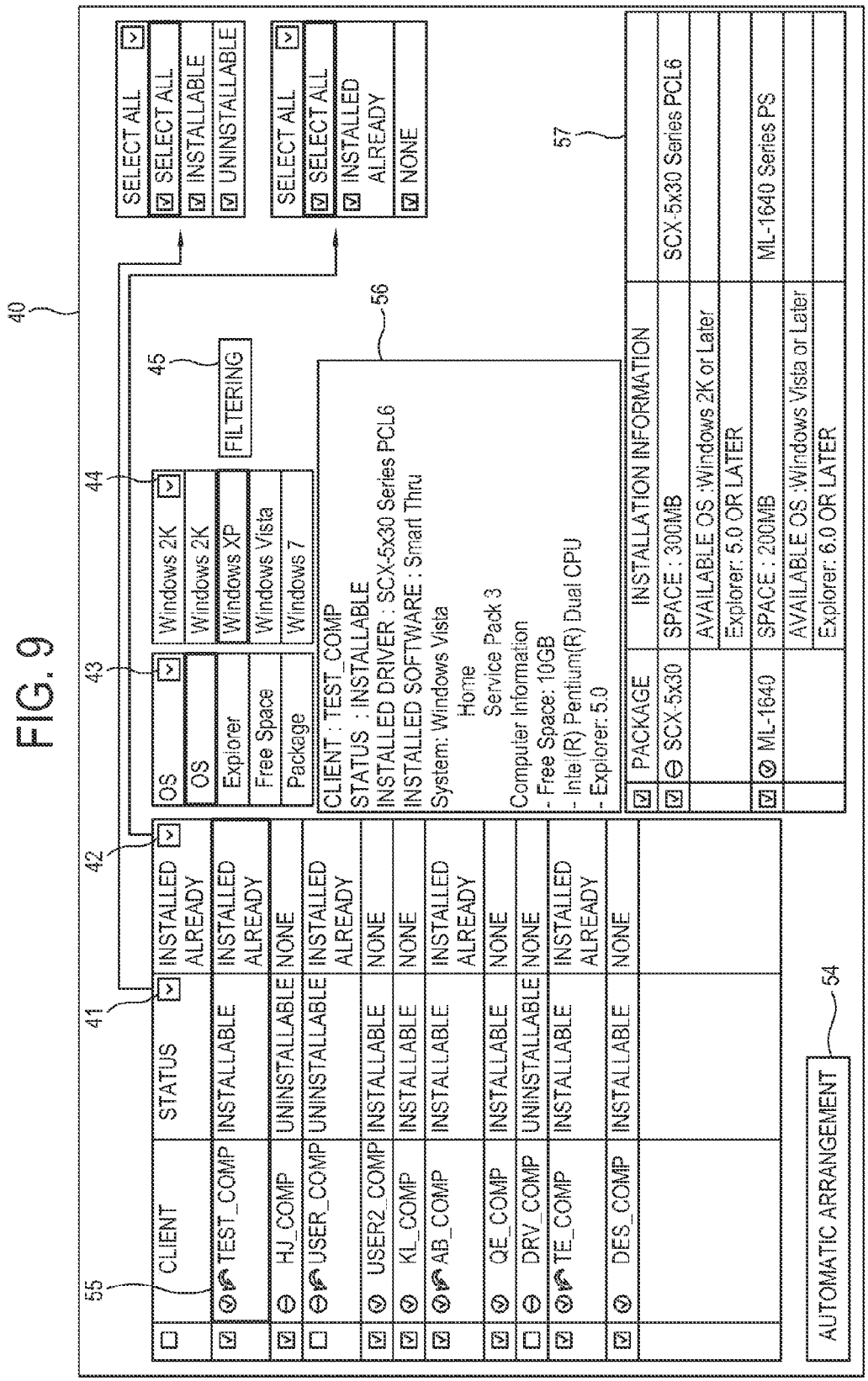

FIGS. 8 and 9 illustrate an installation information screen 40 displayed in a server according to exemplary embodiments of the present general inventive concept.

As illustrated FIGS. 8 and 9, the first controller 150 can control the first display 120 to display whether the selected driver may be installed in one or more clients (e.g., each client), whether the driver is already installed, whether to satisfy a minimum installation condition, etc. according to at least a portion of the status information transmitted from the selected client.

In addition to the information about whether the selected driver may be installed in each client and whether the driver is already installed, the status information can be transmitted from the client may include one or more of information about an OS of the client, information about a web browser, information about available space, hardware information, information about a previously installed driver, and whether to update, etc., and the installation information screen 40 can filter installation information of the client according to such installation information and displays it.

That is, the user may filter the information and display selected and/or predetermined information using, for example, drop-down list buttons 41, 42, 43, and 44 and a filtering button 45 on the installation information screen 40.

If the user selects any one client (e.g., HJ_COMP 51) on a client list, as illustrated in FIG. 8, the installation information screen 40 can display details 52 and 53 about the selected client.

Accordingly, the user can confirm status information of one or more clients (e.g., each client), whether to satisfy a minimum installation condition (e.g., installation space and installable OS, browser information, etc.) according to the kind of a selected driver, information about available space, hardware information, information about a previously installed driver, and whether to update, etc. through the details 52 and 53.

Here, if a driver is not installable as HJ_COMP in FIG. 8, the installation information screen 40 may display whether each selected driver is installable. Accordingly, the user can exclude a not-installable driver (e.g., SCX-5x30) from selection, and an installable driver (e.g., ML-1640) may be selected (e.g., by the user) to be installed.

When the user selects an automatic arrangement button 54 in FIG. 8, the first display 120 can display a client where the selected driver is installable via filtering selected clients.

Similarly, if the user selects any one client (e.g., TEST_COMP 55) on the client list, as illustrated in FIG. 9, the installation information screen 40 can display details 56 and 57 about the selected client.

Accordingly, the user can confirm status information of each client, whether to satisfy a minimum installation condition (e.g., installation space and installable OS, browser information, etc.) according to, for example, the kind of a selected driver, information about available space, hardware information, information about a previously installed driver, and whether to update, etc. through the details 56 and 57.

Here, if a driver is installable as TEST_COMP in FIG. 9 and previously installed, the installation information screen 40 can display whether one or more selected drivers (e.g., each selected driver) needs updating. The user can confirm that SCX-5x30 needs updating and ML-1640 does not need updating.

When the user selects the automatic arrangement button 54 in FIG. 9, the first display 120 can display a client where the selected driver is installable via filtering selected clients.

The server 100 can determine the kind of a driver to be installed in each client using the at least a portion of the information that is displayed in the installation information screen 40 of FIGS. 8 and 9. Here, the first controller 150 can automatically determine the kind of a driver installable in each client when the automatic arrangement button 54 of FIGS. 8 and 9 is selected, and/or can determine a driver to be installed by received selection (e.g., a user's selection).

When determining the kind of a driver to be installed, the server 100 can transmit a command (e.g., EXECUTE[MSG+ START+END]) to display a message of whether to agree to installation of a driver to one or more clients (e.g., each client).

Figure 10:
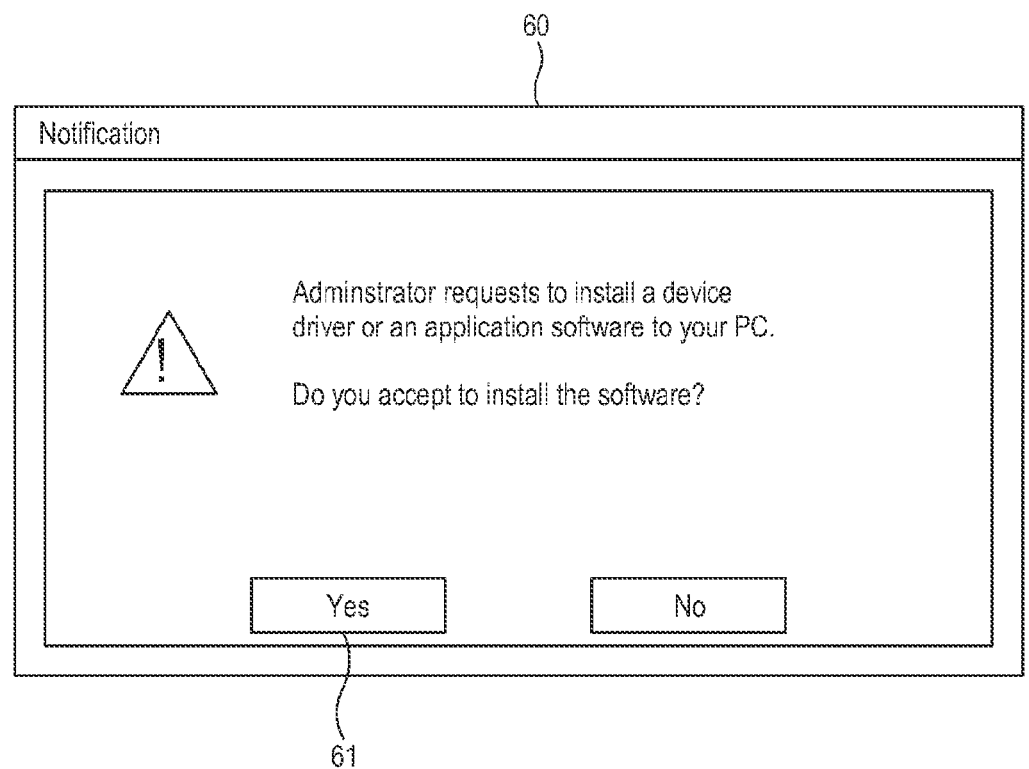
FIG. 10 illustrates a user agreement message displayed by a client according to exemplary embodiments of the present inventive concept.

A client can receive the message displaying command and can display a message screen 60 in FIG. 10 on the second display 220.

A user of one or more clients (e.g., each client) can select a YES button 61 on the message screen 60 of FIG. 10 to agree to installation.

In FIG. 10, when a client agrees to remote installation of a driver, the server 100 can control the first display 120 to receive information about an installation state from each client included in the group selected in FIG. 3 and to display it by each client.

Here, the first controller 150 can conduct remote installation by copying and executing a different final installation file in one or more clients (e.g., each client) according to at least status information of each client and environment information of the driver.

Figure 11:
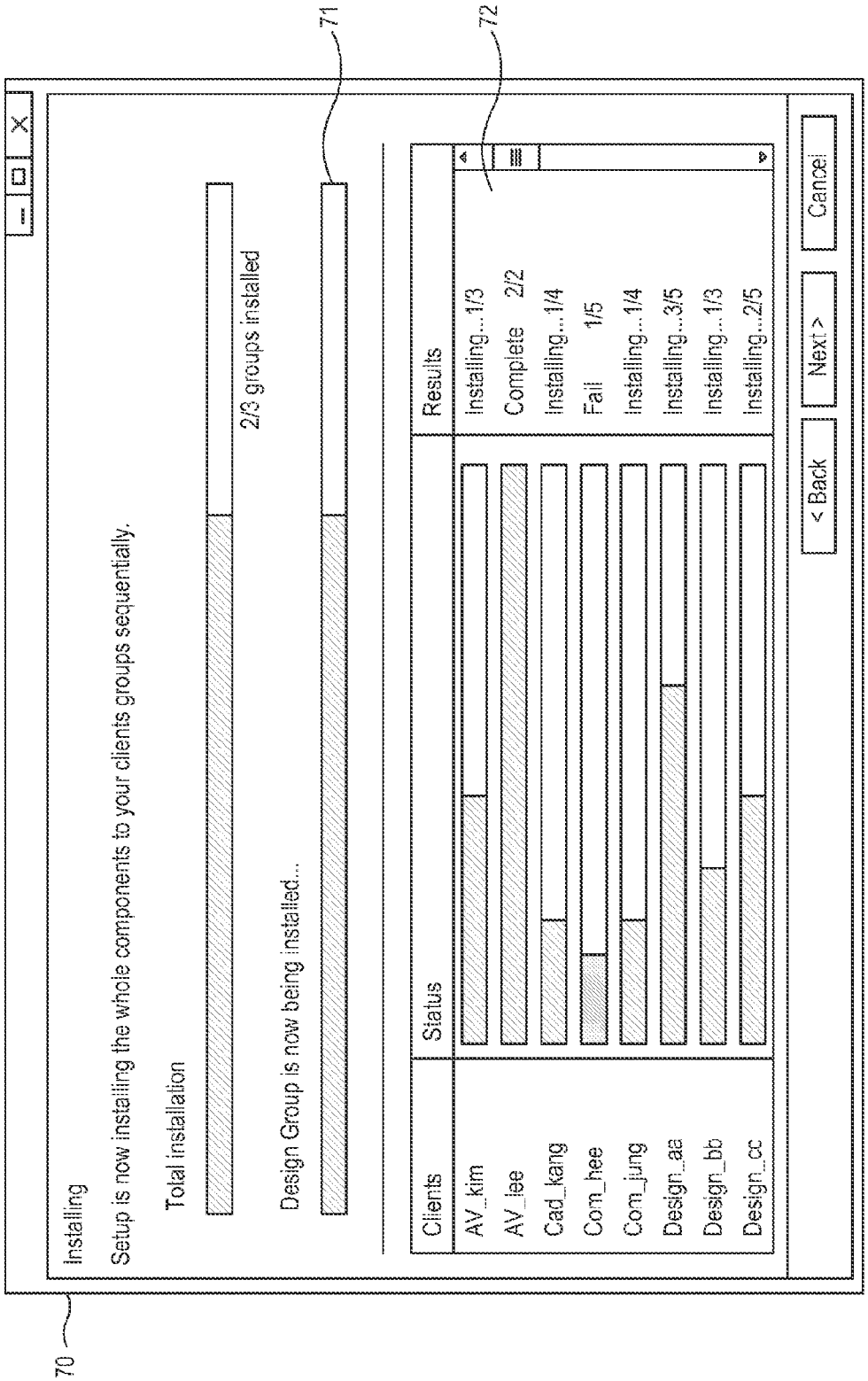
FIG. 11 illustrates a screen displaying installation states of one or more clients according to exemplary embodiments of the present general inventive concept.

FIG. 11 illustrates a screen 70 displaying installation states by clients according to exemplary embodiments of the present general inventive concept.

As illustrated in FIG. 11, the display screen 70 can include a graph 71 illustrating a degree of installing a driver (e.g., illustrating an amount installed out of a total amount for a complete installation in a group of clients) in a group of clients and a graph 72 illustrating a degree of installing the driver by clients included in the group (e.g., illustrating an amount installed out of a total amount for a complete installation for each client in the group of clients). Accordingly, the user can easily identify installation states for the group of clients and for each client in thegroup, as well as the different kinds and numbers of drivers are installed in each client depending on status information of each client through the first display 120.

When completing installation of a driver, the first controller 150 can control the first communication unit 140 to transmit a command (e.g., EXECUTE[MSG+END]) to display a message indicating completion or failure of an installation in one or more clients.

Figure 12:
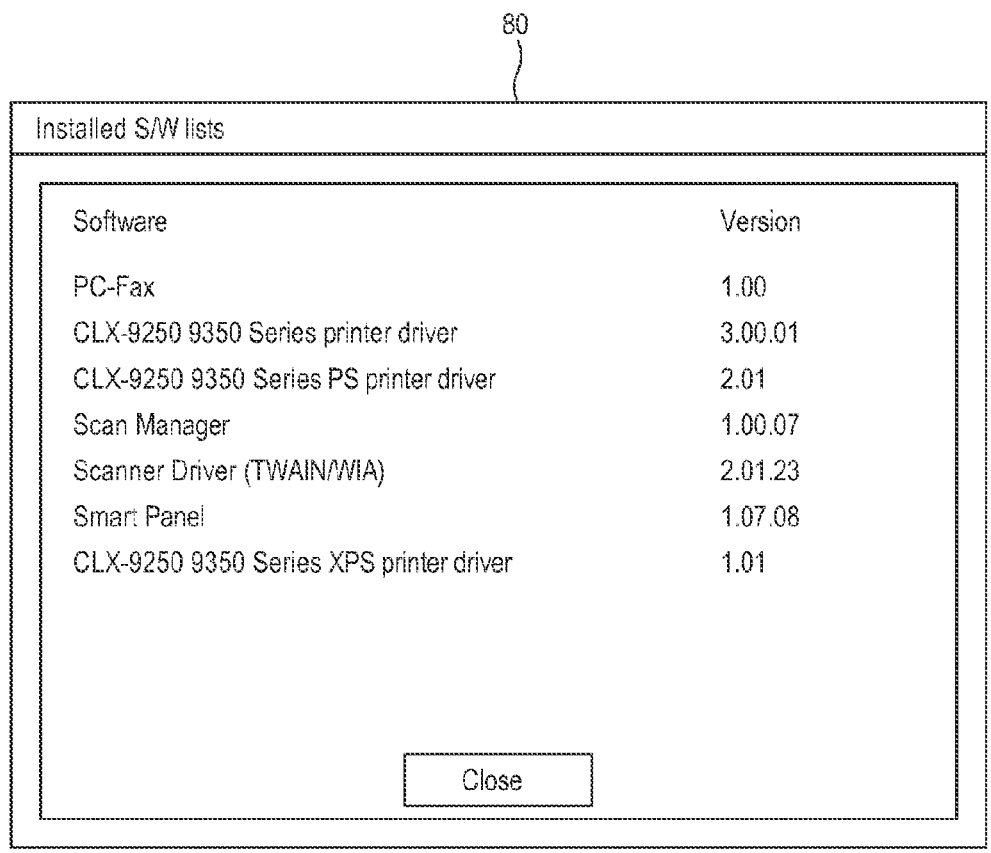
FIG. 12 illustrates a message of an installation result displayed by a client according to exemplary embodiments of the present general inventive concept.

Accordingly, the second display 220 of each client displays a message 80 illustrating whether to complete or fail in remote installation as illustrated in FIG. 12.

When the user selects execution of re-installation in a selected client where installation failed, the controller 250 can carry out re-installation of the driver in the selected client in a remote mode. At least one of the installation program and the installing manager copied to a client where installation is completed may be deleted.

The copy and installation operation of the installation program may be carried out in the background (i.e., in a silent mode), so that a user using a corresponding client may not recognize the occurrence of the copy and/or installation operations.

Hereinafter, a process of installing a driver in a remote mode in the image forming system 10 with the foregoing configuration will be explained with reference to FIGS. 13A, 13B, and 14.

Figure 13A:
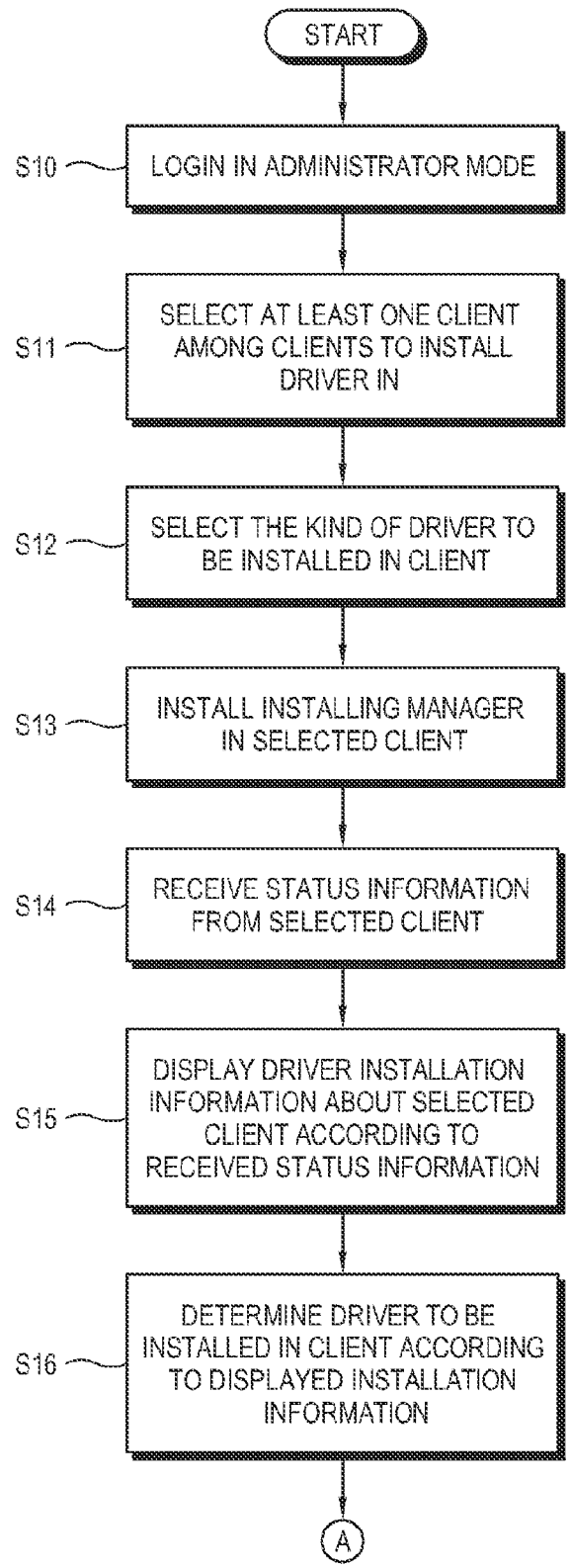
FIGS. 13A and 13B are flow charts illustrating a process of remotely installing a driver according to exemplary embodiments of the present general inventive concept.
Figure 13B:
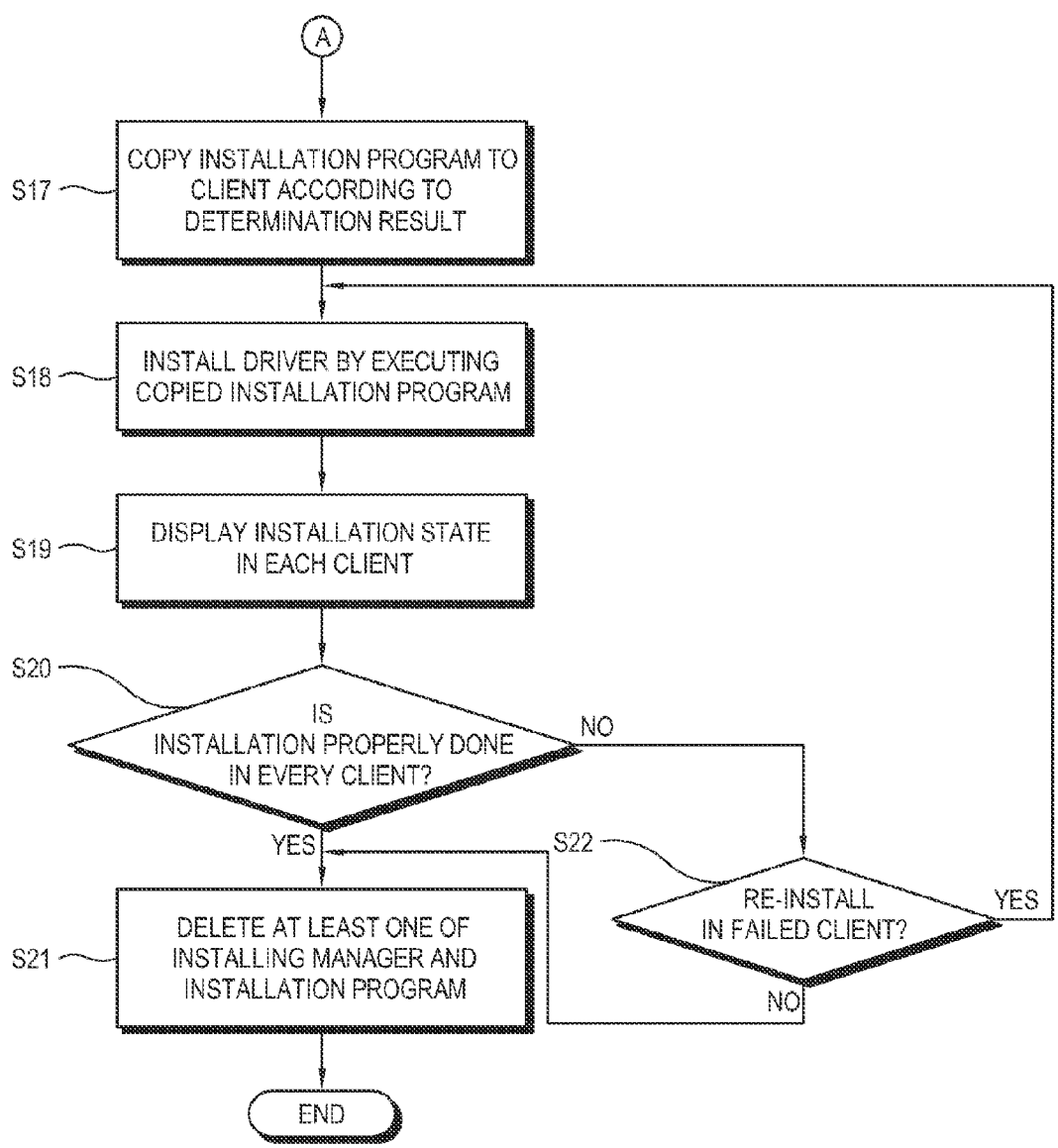

FIGS. 13A and 13B are flow charts illustrating a process of remotely installing a driver according to exemplary embodiments of the present general inventive concept.

Referring to FIG. 13A, a user can login to at least one client 200-1, 200-2, . . . , and 200-n in an administrator mode at operation S10. Here, a login administrator ID and password can be identified (e.g., the login and password can be verified as being that of an administrator), and a client identified as an administrator can become the server 100.

At operation S11, the server 100 can select at least one client where a driver of at least one image forming apparatus 300-1, 300-2, . . . , and 300-n can be installed among at least one client 200-1, 200-2, . . . , and 200-n. Operation S11 can include setting up a group including the selected at least one client. Information of the set-up group may be stored in the first storage unit 130. A user can use pre-stored group information when setting up a group, and the pre-stored group information can include clients included in a certain group (e.g., predetermined group, a previously established group, etc.), installation information of a driver in each client, etc.

At operation S12, the server 100 can select the kind of a driver to be installed in the selected client at operation S11.

At operation S13, a monitoring program (e.g., an installing manager) can be installed in the server 100 and the selected client. Operation S13 can include executing a pre-installed program, or updating and executing a program.

At operation S14, the server 100 can receive status information of the client selected at operation S11 using the installing manager installed at operation S13. Here, the server 100 can transmit a command to explore an environment of the client, such as SCAN[ALL], SCAN[SW], and SCAN[SW+ VER], to the client and can receive the status information as a response to the transmitted command. The client can extract the status information of the client and can transmit it to the server 100 through an analysis process described below with reference to FIG. 14. The received status information can include information about an OS of the client, information about a web browser, information about available space, hardware information, information about a previously installed driver, whether to update, etc.

At operation S15, the server 100 can display installation information of a driver in the client selected at operation S11 according to the status information of the client received at S14. Here, the first display 120 of the server 100 may display whether the kind of a driver in each client selected at operation S12 as illustrated in FIGS. 8 and 9 may be installed, whether a selected driver is previously installed, whether to satisfy a minimum installation condition (e.g., storage space required for installation, an OS, a version of a browser, hardware such as CPU, etc.), etc. The first display 120 can filter installation information of the client, selected according to at least one of the status information received at operation S16 and the kind of the driver selected at operation S12, in accordance with whether the driver is installable and displays it. The first display 120 may filter and display whether each kind of the selected driver may be installed.

At operation S16, the server 100 determines a driver installed in each client at operation S11 according to the installation information displayed at operation S15. Here, the server 100 receives user's selection corresponding to the installation information displayed at operation S15 to finally determine the kind of a driver to be installed in each client or decides to selectively install only a driver satisfying a minimum condition in each client using the automatic arrangement button 54 in FIG. 8 or FIG. 9.

Referring to FIG. 13B, in operation S17, the server 100 can copy an installation program corresponding to the kind of the driver determined at operation S16 to the client selected at operation S11. Here, in operation S17, the installation program (an installation configuration file) can be copied to each client may be different depending on the kind of the driver determined at operation S16.

The server 100 may transmit any one or more of EXECUTE[MSG+START], EXECUTE[MSG+START+END], and EXECUTE[MSG+END] as a remote installation command to one or more clients (e.g., each client) at operation S17. Here, a client which receives EXECUTE[MSG+START] or EXECUTE[MSG+START+END] can display a message 60 to accept or refuse remote installation, as illustrated in FIG. 10, and the server 100 can conduct remote installation when receiving an acceptance response from the client.

The copy process at operation S17 can include sharing a folder which stores the installation program. Here, the shared folder may be provided in the server 100 and/or in one of a plurality of clients 200-1, 200-2, . . . , and 200-n.

The server 100 can execute the installation program copied at operation S17 to install the driver at operation S18.

The server 100 can display an installation state in each client where the installation program is executed at S18 to the user through the first display 120 (S19). The display process at S19 can include displaying whether the installation of the driver in each client is completed or failed, as illustrated in FIG. 10, and the graph 72 illustrates the kind of a driver installed in each client may be different.

The server 100 can determine whether the driver is properly installed in one or more of the selected clients (e.g., at each client selected at operation S11) at operation S20.

If the driver is properly installed in at least one client (e.g., every client selected at operation S11) as determined at operation S20, the server 100 can delete at least one of the installation program and installing manager copied to each client and finishes all remote installation operations. Here, if EXECUTE[MSG+START+END] or EXECUTE[MSG+END] is transmitted as a remote installation command at S17, a client in which the driver is properly installed can display a message 80 on the second display 220, as illustrated in FIG. 12.

If the driver is not properly installed in one or more clients as determined at operation S20, the user may select whether to re-install the driver in a client where the installation is failed through the first user input nit 110 at operation S22.

If the user selects re-installation at operation S22, the server 100 can conduct installation of the driver again in a corresponding client (e.g., a selected client).

Figure 14:
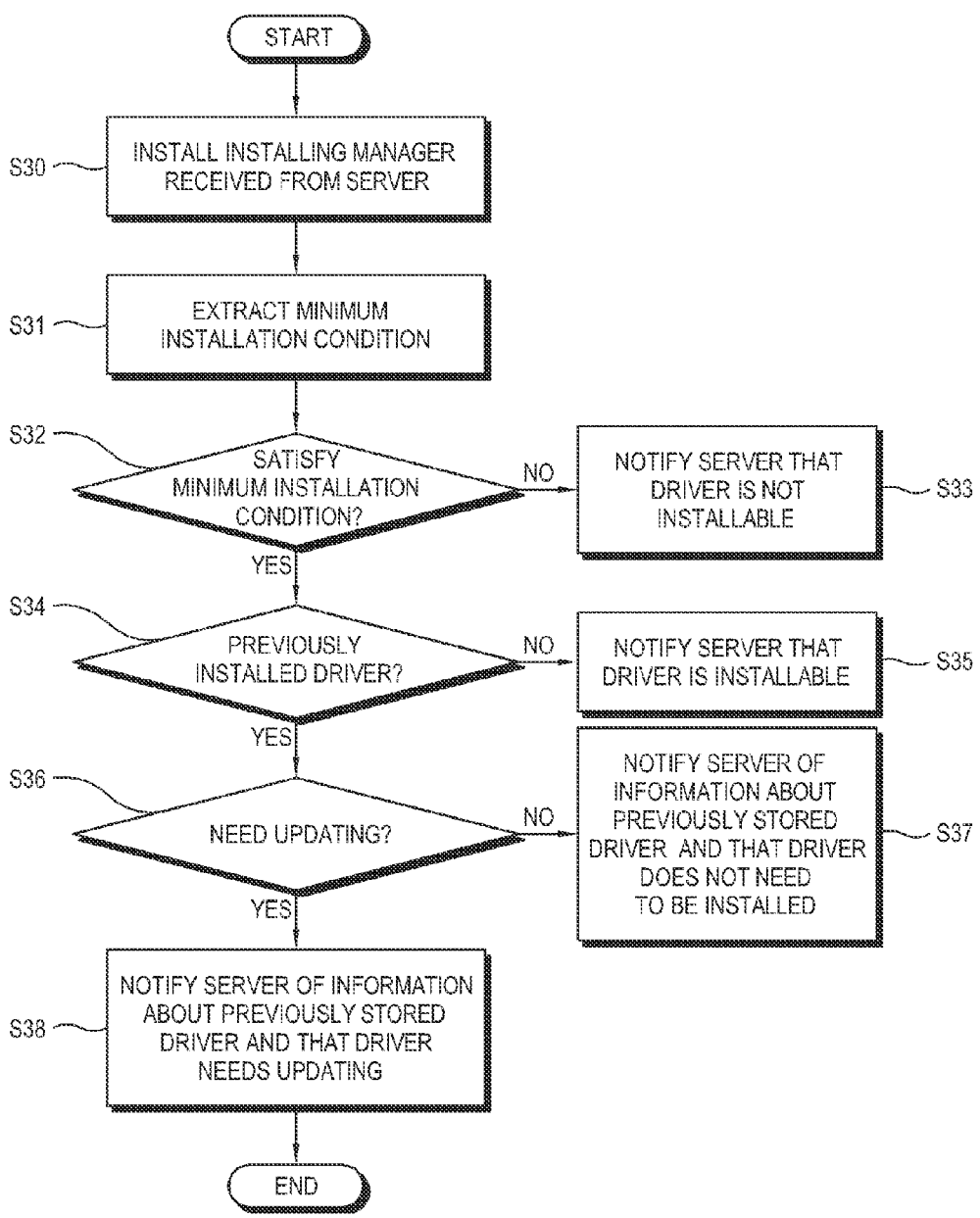
FIG. 14 is a flow chart illustrating a process of analyzing a state of a client selected to install a driver according to exemplary embodiments of the present general inventive concept.

FIG. 14 is a flow chart illustrating a process of analyzing a status of a client selected to install a driver in according to exemplary embodiments of the present general inventive concept.

Referring to FIG. 14, at operation S30, the client selected at operation S11 in FIG. 13A can install the installing manager received from the server at operation S13 therein.

At operation S31, the client can extract a minimum installation condition of a driver to be installed in the client on, for example, the basis of the kind of the driver selected at operation S12 according to the command received from the server 100 at operation S14. Here, the minimum installation condition can include an OS for installation of a selected driver, a browser, hardware such as CPU, space required for installation, etc.

The client can determine whether to satisfy the minimum installation condition extracted at operation S31 according to an environment of the client at operation S32.

If the client does not satisfy the minimum installation condition at operation S32, the client can notify the server 100 of not allowing installation of the driver operation S33.

If the client satisfies the minimum installation condition at S32, the client can determine whether the driver selected at operation S12 is a previously installed driver in the client at operation S34.

If the driver is not the previously installed driver at operation S34, the client can notify the server 100 of allowing installation of the driver at operation S35.

If the driver is the previously installed driver at operation S34, the client can compare a version of the previously installed driver with a version of the driver to be installed and can determine whether the driver needs updating at operation S36 according to the version information.

As a result of determination at operation S36, if updating of the driver is not necessary, the client informs the server 100 of information about the previously installed driver and that installation of the driver is not needed at operation S37.

If it is determined that the driver is to be updated, the client can inform the server 100 of the information about the previously installed driver and that installation of the driver is needed at operation S38.

The server can receive the status information, provided at one or more of operations S33, S35, S37, and S38, A to display the installation information of the driver at operation S14 of FIG. 13A, as illustrated in FIG. 8 or 9.

The determination processes at operations S32, S34, and S36 may be carried out by comparing the registry information by the analyzer of the client in FIG. 7 with the kind of the driver selected at operation S12 of the FIG. 13A and may be conducted independently in one or more clients (e.g., each client) selected operation S11.

One or more exploring results by the analyzer of the client may be transmitted to the server 100, or information about only a driver to be installed or update may be selectively transmitted to the server 100.

The process of analyzing the client illustrated in FIG. 14 may be realized in the server 100 if information about one or more clients (e.g., each client) is stored in the server (e.g., server 100).

According to exemplary embodiments of the present general inventive concept, the server 100 can install a driver in at least one client in a remote mode and can determine a driver to be installed in consideration of an environment of each client, thereby achieving efficiency in time and cost as well as providing facilitation of installation to a user in a remote installation process.

As described above, in a server (e.g., server 100) connected to an image forming apparatus (e.g., image forming apparatus 300-1, 300-2, . . . 300-*n*) and a client (e.g., client 200-1, 200-2, . . . , 200-*n*), a client, and a method of remotely installing a driver of the image forming apparatus according to exemplary embodiments the present general inventive concept, the server can receive status information of a client to install a driver in and can selectively install the driver according to the status information to save time and cost involved in unnecessary installation.

Also, the server can filter and display installation information depending on whether a driver is installable according to the received status information, thereby providing convenience to a system administrator.

Although several exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A method of remotely installing a driver of an image forming apparatus in which a server is connected to at least one image forming apparatus and a plurality of clients, the method comprising:
    selecting at least one group where a driver of the image forming apparatus is to be installed, each of the at least one group comprising a plurality of clients;
    selecting a kind of at least one driver to be installed in a plurality of clients comprised in the selected at least one group;
    extracting, with the plurality of clients comprised in the selected at least one group, a minimum installation condition from the selected at least one driver;
    receiving status information from each of the plurality of clients comprised in the selected at least one group, the status information including at least whether to satisfy the minimum installation condition extracted from the at least one driver comprising at least one of available capacity and hardware of each of the plurality of clients comprised in the selected at least one group;
    comparing the received status information with stored information for each of the plurality of client comprised in the selected at least one group and updating the stored information of each of the plurality of clients comprised in the selected at least one group according to the comparison;
    displaying installation information of the driver on each of the plurality of clients comprised in the at least one selected group based on the updated information;
    determining whether the selected driver is capable of being installed on at least one of the plurality of clients comprised in the selected at least one group according to the displayed installation information;
    filtering and displaying a plurality of clients where the selected driver is installable among the plurality of clients comprised in the selected at least one group; and
    installing the selected driver in each of the plurality of clients where the selected driver is installable according to the determination result.

2. The method according to claim 1, wherein the status information includes at least one of whether the selected driver is installable in each of the plurality of clients comprised in the at least one selected group and whether the selected driver is previously installed each of the plurality of clients comprised in the at least one selected group.

3. The method according to claim 2, wherein the status information further includes at least one of information about an operating system, information about a web browser, information about a previously installed driver, and whether to update the driver for each of the plurality of clients comprised in the at least one selected group.

4. The method according to claim 2, wherein the displaying the installation information comprises:
    filtering and displaying the installation information of the plurality of clients comprised in the selected at least one group according to at least one of the received status information and the kind of the driver.

5. The method according to claim 4, wherein the filtering and displaying comprises:
    filtering and displaying whether the kind of driver is installable.

6. The method according to claim 1, further comprising:
    displaying a message on the plurality of clients where the selected driver is installable to agree with installation of the driver; and
    receiving a selection to agree or disagree to install the driver.

7. The method according to claim 1, further comprising:
    installing an installing manager to install the driver in the plurality of clients where the selected driver is installable, wherein the receiving the status information and the selectively installing the driver use the installing manager.

8. The method according to claim 1, wherein the selecting the at least one group comprises:
    setting up the group including a plurality of clients.

9. A server which is connected to at least one image forming apparatus and a plurality of clients, comprising:
    a communication unit to communicate with the at least one image forming apparatus and the at least one client;
    a display;
    a user input unit to receive a selection of at least one group where a driver of the image forming apparatus is installed and to receive a selection of a kind of at least one driver installed in a plurality of clients comprised in the selected at least one group, each of the at least one group comprising a plurality of clients;
    a storage unit to store information of the plurality of clients comprised in the at least one group; and
    a controller to control the communication unit to receive status information from each of the plurality of clients comprised in the selected at least one group including whether to satisfy a minimum installation condition that is extracted from the at least one driver by the plurality of clients comprised in the selected at least one group comprising at least one of available capacity and hardware of each of the plurality of clients comprised in the selected at least one group, to control the display to display installation information of the driver in each of the plurality of clients comprised in the selected group according to the received status information, to compare the status information with the stored information for each of the plurality of clients comprised in the select group and update the stored information of the plurality of clients comprised in the selected group, to determine whether the selected driver is capable of being installed on at least one of the plurality of clients comprised in the selected at least one group according to the displayed installation information, and to control the communication unit to transmit a command to selectively install the driver in each of the plurality of clients where the selected driver is installable to each of the plurality of clients where the selected driver is installable according to the determination result, wherein the display filters and displays the plurality of clients where the selected driver is installable among the plurality of clients comprised in the selected at least one group.

10. The server according to claim 9, wherein the status information includes at least one of whether the selected driver is installable in each of the plurality of clients comprised in the at least one selected group and whether the selected driver is previously installed in each of the plurality of clients comprised in the at least one selected group.

11. The server according to claim 10, wherein the status information further includes at least one of information about an operating system, information about a web browser, information about a previously installed driver, and whether to update the driver for each of the plurality of clients comprised in the at least one selected group.

12. The server according to claim 10, wherein the display filters and displays the installation information of the plurality of clients comprised in the selected at least one group according to at least one of the received status information and the kind of the driver.

13. A method of remotely installing a driver of an image forming apparatus that is communicatively coupled to at least one image forming apparatus and a plurality of clients, the method comprising:

receiving a selection of a group where a driver of the image forming apparatus is to be installed, the group comprising a plurality of clients;

receiving status information from each of the plurality of clients comprised in the selected group, the status information including at least whether to satisfy a minimum installation condition that is extracted from the driver available to the plurality of clients comprised in the selected group comprising at least one of available capacity and hardware of each of the plurality of clients comprised in the selected group;

comparing the received status information with stored information of the plurality of clients comprised in the selected group and updating the stored information of the plurality of clients comprised in the selected group according to the comparison;

determining whether the selected driver is capable of being installed on at least one of the plurality of clients comprised in the selected group according to the received status information and the comparison;

filtering and displaying a plurality of clients where the selected driver is installable among the plurality of clients comprised in the selected at least one group; and installing the driver in each of the plurality of clients where the selected driver is installable according to the determination result.

14. The method of claim 13, further comprising:
receiving a selection of a kind of driver to be installed on the plurality of clients comprised in the selected group,
wherein the installing the driver in the plurality of clients where the selected driver is installable includes installing the driver according to the received selection of the kind of driver.

15. The method of claim 13, further comprising:
determining an amount that the driver is installed on the plurality of clients where the selected driver is installable; and
displaying the determined amount that the driver is installed on the plurality of clients comprised in where the selected driver is installable.

16. A server communicatively coupled to an image forming apparatus and a plurality of clients, the server comprising:
an interface to receive a selection of a group where a driver of the image forming apparatus is to be installed, the group comprising a plurality of clients;
a storage unit to store information of the plurality of clients comprised in the group;
a communication unit to receive status information from each of the plurality of clients comprised in the selected group, the status information including at least whether to satisfy a minimum installation condition that is extracted from the driver available to the plurality of clients comprised in the selected group comprising at least one of available capacity and hardware of the plurality of clients comprised in the selected group;
a controller to compare the status information with the stored information of each of the plurality of clients comprised in the group and update the stored information of each of the plurality of clients comprised in the group, to determine whether the selected driver is capable of being installed on at least one of the plurality of clients comprised in the selected group according to the received status information and the comparison, and to control the installation of the driver in the plurality of clients where the selected driver is installable according to the determination result; and
a display device to filter and display the plurality of clients where the selected driver is installable among the plurality of clients comprised in the selected at least one group.

17. The server of claim 16, wherein the controller to control the installation of the driver in the plurality of clients where the selected driver is installable installs the driver according to the received status information and the received selection of the kind of driver.

18. The server of claim 16, wherein the controller determines an amount that the driver is installed on the plurality of clients client where the selected driver is installable, and displays the determined amount that the driver is installed on the plurality of clients where the selected driver is installable on the display device.

* * * * *